US012770866B2

(12) United States Patent
Chen et al.

(10) Patent No.: US 12,770,866 B2
(45) Date of Patent: Oct. 20, 2026

(54) BATTERY ELECTRODE PLATE, ELECTRODE PLATE ASSEMBLY, BATTERY AND ELECTRICAL DEVICE

(71) Applicant: CONTEMPORARY AMPEREX TECHNOLOGY (HONG KONG) LIMITED, Hong Kong (CN)

(72) Inventors: Yuefei Chen, Ningde (CN); Jiali Jiang, Ningde (CN); Guoan Mao, Ningde (CN); Junqi Cao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 9 days.

(21) Appl. No.: 18/947,005

(22) Filed: Nov. 14, 2024

(65) Prior Publication Data

US 2025/0070142 A1 Feb. 27, 2025

Related U.S. Application Data

(63) Continuation of application No. PCT/CN2023/082735, filed on Mar. 21, 2023.

(30) Foreign Application Priority Data

Jun. 30, 2022 (CN) ......................... 202210759331.8

(51) Int. Cl.

*H01M 4/36* (2006.01)
*H01M 4/02* (2006.01)
*H01M 4/58* (2010.01)

(52) U.S. Cl.

CPC ............. *H01M 4/366* (2013.01); *H01M 4/58* (2013.01); *H01M 2004/021* (2013.01)

(58) Field of Classification Search

None

See application file for complete search history.

(56) References Cited

U.S. PATENT DOCUMENTS 11,228,028 B2 1/2022 Chang et al.
2015/0194664 A1* 7/2015 Saka .................... H01M 4/362 429/221

(Continued)

FOREIGN PATENT DOCUMENTS

CN 104766993 A 7/2015
CN 206022538 U 3/2017

(Continued)

OTHER PUBLICATIONS

International Search Report and Written Opinion mailed on Jun. 13, 2023, received for PCT Application No. PCT/CN2023/082735, filed on Mar. 21, 2023, 14 pages including English Translation.

(Continued)

*Primary Examiner* — Zhongqing Wei
(74) *Attorney, Agent, or Firm* — XSENSUS LLP

(57) ABSTRACT

The present application relates to the technical field of batteries, and in particular, to a battery electrode plate, an electrode plate assembly, a battery, and an electrical device. The battery electrode plate of the present application comprises a current collector, at least one surface of the current collector being provided with a first coating area, the first coating area being provided with an active material layer, and the active material layer comprising a first active material layer, a second active material layer, and a third active material layer that are connected sequentially from top to bottom along the height direction of the current collector, wherein the attenuation speed of the active material of the second active material layer is smaller than that of (Continued)

the active material in any one of the first active material layer and the third active material layer.

19 Claims, 5 Drawing Sheets

(56) References Cited

U.S. PATENT DOCUMENTS

| | | | | |
|---|---|---|---|---|
| 2020/0328427 | A1* | 10/2020 | Yamada | H01M 4/624 |
| 2023/0042302 | A1* | 2/2023 | Wang | H01M 4/13 |

FOREIGN PATENT DOCUMENTS

| | | | |
|---|---|---|---|
| CN | 207576827 | U | 7/2018 |
| CN | 108987671 | A | 12/2018 |
| CN | 109585782 | A | 4/2019 |
| CN | 110581256 | A | 12/2019 |
| CN | 111313015 | A | 6/2020 |
| CN | 111540910 | A | 8/2020 |
| CN | 111554965 | A | 8/2020 |
| CN | 110504410 | B | 4/2021 |
| CN | 113140696 | A | 7/2021 |
| CN | 113140697 | A | 7/2021 |
| CN | 113363480 | A | 9/2021 |
| CN | 113707836 | A | 11/2021 |
| CN | 113948673 | A | 1/2022 |
| CN | 215656137 | U | 1/2022 |
| CN | 114497445 | A | 5/2022 |
| EP | 4318645 | A1 | 2/2024 |
| EP | 4318669 | A1 | 2/2024 |
| JP | 2009-252497 | A | 10/2009 |
| JP | 2011-070976 | A | 4/2011 |
| JP | 2013-131322 | A | 7/2013 |
| JP | 2015-146254 | A | 8/2015 |
| JP | 2019-186057 | A | 10/2019 |
| KR | 10-2016-0100583 | A | 8/2016 |

OTHER PUBLICATIONS

First Office Action mailed on Sep. 28, 2023, received for CN Application 202210759331.8, 24 pages including English Translation.

Second Office Action mailed on Jan. 12, 2024, received for CN Application 202210759331.8, 20 pages including English Translation.

Notification to Grant Patent Right for Invention mailed on Mar. 7, 2024, received for CN Application 202210759331.8, 03 pages including English Translation.

Logan E. R. , et al., "The Effect of LifePO4 Particle Size and Surface Area on the Performance of LifePO4/Graphite Cells", Journal of the Electrochemical Society, vol. 169, No. 5, May 16, 2022, p. 50524.

Extended European Search Report issued Oct. 27, 2025 in European Patent Application No. 23829510.9.

* cited by examiner

BATTERY ELECTRODE PLATE, ELECTRODE PLATE ASSEMBLY, BATTERY AND ELECTRICAL DEVICE

CROSS-REFERENCE TO RELATED APPLICATIONS

The present application a continuation of International Application No. PCT/CN2023/082735, filed on Mar. 21, 2023, which claims the priority and benefits of the following patent application, the entire content of both of which is incorporated by reference in the present application:

a Chinese patent application with the application number of 202210759331.8 filed with the China National Intellectual Property Administration on Jun. 30, 2022 and entitled "BATTERY ELECTRODE PLATE, ELECTRODE PLATE ASSEMBLY, BATTERY AND ELECTRICAL DEVICE".

TECHNICAL FIELD

The present application relates to the technical field of batteries, and in particular, to a battery electrode plate, an electrode plate assembly, a battery, and an electrical device.

BACKGROUND

Lithium-ion batteries have been widely used in mobile and portable appliances due to their high energy density, high average open circuit voltage and long cycle life. The electrode plate of a commercial lithium-ion battery contains a current collector and an active material layer, where the active material layer is a continuous and uniform coating.

Liquid absorption capacity is an important parameter that affects the performance of a lithium-ion battery. The liquid absorption capacity of a battery is mainly limited by the liquid absorption capacity of the middle area of the electrode plate. Since the middle area of the electrode plate undertakes most of the liquid absorption function, and the heat dissipation capacity of the middle area of the electrode plate is poor, after the battery is used for a period of time, the attenuation speed of the middle area of the electrode plate is higher than that of the top and bottom of the electrode plate in the height direction, thereby affecting the overall service life of the battery.

SUMMARY OF THE DISCLOSURE

In view of the defects existing in the prior art, the purpose of the present application is to provide a battery electrode plate, an electrode plate assembly, a battery and an electrical device, which can effectively solve the problem that the attenuation speed of the central region of an electrode plate is higher than that of the top and bottom of the electrode plate in the height direction.

A first aspect of the present application discloses a battery electrode plate, which includes:

a current collector, at least one surface of the current collector being provided with a first coating area, the first coating area being provided with an active material layer, and the active material layer including a first active material layer, a second active material layer and a third active material layer that are connected sequentially from top to bottom along the height direction of the current collector, wherein the attenuation speed of the active material of the second active material layer is smaller than that of the active material in any one of the first active material layer and the third active material layer.

According to the battery electrode plate of the present application, the first active material layer, the second active material layer, and the third active material layer are connected sequentially from top to bottom in the height direction of the current collector, wherein the attenuation speed of the active material of the second active material layer is smaller than that of the active material in any one of the first active material layer and the third active material layer, so that the attenuation speed of the second active material layer can be reduced, and the attenuation speed caused by the middle area of the battery electrode plate bearing most of the liquid absorption capacity as well as the attenuation speed caused by poor heat dissipation ability can be offset. In this way, the attenuation speeds of the first active material layer, the second active material layer, and the third active material layer are basically the same, thereby improving the overall service life of the battery electrode plate, and improving the overall service life of the battery.

In some embodiments of the present application, the second active material layer includes one or more of a lithium iron phosphate layer, a lithium iron manganese phosphate layer, and a lithium titanate layer. Among them, the attenuation speed of the material of any of the lithium iron phosphate layer, the lithium iron manganese phosphate layer, and the lithium titanate layer is slower than that of general electrode materials, thereby reducing the attenuation speed of the second active material layer and making the attenuation speeds of the first active material layer, the second active material layer, and the third active material layer basically the same.

In some embodiments of the present application, the first active material layer includes at least one of a nickel-cobalt-manganese layer and a lithium cobalt oxide layer; and/or the third active material layer includes at least one of a nickel-cobalt-manganese layer and a lithium cobalt oxide layer. Among them, the material of any one of the nickel-cobalt-manganese layer and the lithium cobalt oxide layer has a high energy density, thereby ensuring the energy of the battery. At the same time, the attenuation speed of the material of any one of the nickel-cobalt-manganese layer and the lithium cobalt oxide layer is higher than that of the material of any one of the lithium iron phosphate layer, the lithium iron manganese phosphate layer, and the lithium titanate layer, so that the attenuation speeds of the first active material layer, the second active material layer, and the third active material layer are basically the same.

In some embodiments of the present application, the average particle size of the active material of the second active material layer is smaller than that of the active material of any one of the first active material layer and the third active material layer. Among them, a small average particle size indicates that the gaps between the particles are small, thereby slowing down the infiltration rate of the electrolyte solution in the battery electrode plate, reducing the liquid absorption capacity of the battery electrode plate, and thereby reducing the attenuation speed of the second active material layer.

In some embodiments of the present application, the average particle size of the active material of the second active material layer is 100% to 120% of the average particle size of the active material of the first active material layer; and/or the average particle size of the active material of the second active material layer is 100% to 120% of the average particle size of the active material of the third active material layer. The average particle size of the active material of the second active material layer is set to be greater than the average particle size of the active material of the first active material layer, and/or the average particle size of the active material of the second active material layer is set to be greater than the average particle size of the active material of the third active material layer, and the difference is within 20%. At the same time, the attenuation speed of the active material of the second active material layer is smaller than that of the active material of any one of the first active material layer and the third active material layer, which can also ensure that the attenuation speeds of the first active material layer, the second active material layer, and the third active material layer are basically the same.

In some embodiments of the present application, a first boundary line is provided between the first active material layer and the second active material layer, and a second boundary line is provided between the second active material layer and the third active material layer. The first boundary line and the second boundary line are respectively arranged parallel to both ends of the current collector in the height direction. By arranging the first boundary line and the second boundary line parallel to both ends of the current collector in the height direction, it can be ensured that there is the same active material layer along the same height direction of the current collector, so that the attenuation speeds of the first active material layer, the second active material layer, and the third active material layer are basically the same.

In some embodiments of the present application, the second active material layer is disposed at the middle position of the current collector in the height direction. The height dimension of the first active material layer is 10% to 40% of the height dimension of the first coating area, the height dimension of the second active material layer is 20% to 80% of the height dimension of the first coating area, and the height dimension of the third active material layer is 10% to 40% of the height dimension of the first coating area. According to the height dimension of the first coating area, the height dimensions of the first active material layer, the second active material layer, and the third active material layer are arranged according to the above ratio, which can ensure that the attenuation speeds of the first active material layer, the second active material layer, and the third active material layer are basically the same.

In some embodiments of the present application, the height dimension of the first active material layer is 25% to 35% of the height dimension of the first coating area, the height dimension of the second active material layer is 40% to 50% of the height dimension of the first coating area, and the height dimension of the third active material layer is 20% to 30% of the height dimension of the first coating area. The arrangement ratio of the above height dimensions is the optimal arrangement ratio of the present application, so that the attenuation speeds of the first active material layer, the second active material layer, and the third active material layer are basically the same.

In some embodiments of the present application, the coating weight of the second active material layer is 50% to 100% of the coating weight of the first active material layer, and the coating weight of the third active material layer is 80% to 120% of the coating weight of the first active material layer. According to the different materials of the first active material layer, the second active material layer, and the third active material layer, and according to the arrangement ratio of the height dimensions of the first active material layer, the second active material layer, and the third active material layer, the first active material layer, the second active material layer, and the third active material layer are arranged according to the above three weight ratios, which can ensure that the attenuation speeds of the first active material layer, the second active material layer, and the third active material layer are basically the same.

In some embodiments of the present application, the ratio of the coating weight of the first active material layer, the coating weight of the second active material layer, and the coating weight of the third active material layer is 90%-110%:60%-80%:90%-110%. The arrangement ratio of the above coating weights is the optimal arrangement ratio of the present application, so that the attenuation speeds of the first active material layer, the second active material layer, and the third active material layer are basically the same.

In some embodiments of the present application, the coating thickness of the second active material layer is 90% to 100% of the coating thickness of the first active material layer, the coating thickness of the third active material layer is 80% to 110% of the coating thickness of the first active material layer, and the compacted density of the second active material layer is less than that of any one of the first active material layer and the third active material layer. According to the different materials of the first active material layer, the second active material layer, and the third active material layer, the first active material layer, the second active material layer, and the third active material layer are arranged according to the above height dimension ratio, coating thickness ratio, and coating weight ratio, so that the compacted density of the second active material layer is smaller than that of any one of the first active material layer and the third active material layer, which is beneficial for preservation of electrolyte solution, reduces the material expansion amplitude of the second active material layer during the discharge process, and reduces the competitive effect on the top and bottom absorption of electrolyte solution.

In some embodiments of the present application, the coating thickness of the first active material layer, the coating thickness of the second active material layer, and the coating thickness of the third active material layer are consistent. By setting the coating thickness of the first active material layer, the coating thickness of the second active material layer, and the coating thickness of the third active material layer to be consistent, structural problems such as powder drop or stress concentration during the use of the battery electrode plate can be avoided.

In some embodiments of the present application, the current collector is also provided with a second coating area and a tab area, and the tab area, the second coating area, and the first coating area are sequentially arranged on the same surface from top to bottom along the height direction of the current collector, wherein the second coating area is connected to the first coating area, and the second coating area is partially overlapped with the tab area. The second coating area is provided with an insulating material layer, the tab area includes a metal conductive plate, and the metal conductive plate is connected to the current collector or the metal conductive plate is a part of the current collector. The battery electrode plate can be conductively connected to other components through the tab area, and the second coating area is provided between the tab area and the first coating area, wherein the second coating area is provided with an insulating material layer, and the second coating area is partially overlapped with the tab area, thereby isolating the tab area from the active material layer through the insulating material layer, and preventing the tab area from being electrically connected to the case after the battery electrode plate and the case are assembled into a battery.

In some embodiments of the present application, the height dimension of the overlapping portion of the second coating area and the tab area is 4 mm to 16 mm, and the height dimension of the second coating area excluding the overlapping portion with the tab area is 0.5 mm to 4 mm. By setting the above height dimension range, the conductive connection between the battery electrode plate and the case can be effectively prevented, thereby preventing battery leakage.

A second aspect of the present application proposes an electrode assembly. The electrode assembly includes a cathode plate, an anode plate, and a separator disposed between the cathode plate and the anode plate, wherein the cathode plate is the battery electrode plate described in any one of the above.

Since the electrode assembly of the present application has the same technical features as the battery electrode plate described in any one of the above and can achieve the same technical effects, it will not be described again here.

In some embodiments of the present application, at least one surface of the anode plate is provided with a third coating area directly opposite to the first coating area, and both ends of the anode plate are respectively set beyond the two ends of the first coating area. By arranging the third coating area directly opposite to the first coating area, it can be ensured that all active materials in the first coating area and the third coating area participate in the reaction with the electrolyte solution, that is, participate in the discharge process of the electrode, thereby improving the energy of the battery.

In some embodiments of the present application, the third coating area includes a fourth active material layer, a fifth active material layer, and a sixth active material layer that are sequentially connected from top to bottom along the height direction of the third coating area, wherein the ratio of the coating weights of the fourth active material layer, the fifth active material layer, and the sixth active material layer is consistent with the ratio of the coating weights of the first active material layer, the second active material layer, and the third active material layer, and/or the ratio of the coating thicknesses of the fourth active material layer, the fifth active material layer, and the sixth active material layer is consistent with the ratio of the coating thicknesses of the first active material layer, the second active material layer, and the third active material layer, and/or the height dimension of the fourth active material layer is 100% to 140% of the height dimension of the first active material layer, the height dimension of the fifth active material layer is 20% to 100% of the height dimension of the second active material layer, and the height dimension of the sixth active material layer is 100% to 140% of the height dimension of the third active material layer. Arranging the fourth active material layer, the fifth active material layer, and the sixth active material layer according to the above coating weight and/or coating thickness and/or height dimension ratio can effectively reduce the attenuation speed of the middle area of the anode plate, ensuring that the attenuation speeds of active material layers along the height direction of the anode plate are basically the same, thereby cooperating with the cathode plate to jointly improve the service life of the battery.

In some embodiments of the present application, the coating thickness of the fifth active material layer is 50% to 99% of the coating thickness of the fourth active material layer, and/or the coating thickness of the fifth active material layer is 50% to 99% of the coating thickness of the sixth active material layer. The fourth active material layer, the fifth active material layer, and the sixth active material layer are arranged according to the above coating thickness ratio, so that the use of the active material in the fifth active material layer is reduced under the condition that the attenuation speeds of active material layers in the height direction of the anode plate are basically the same, thereby reducing the manufacturing cost of the electrode plate assembly and avoiding the waste of resources.

A third aspect of the present application provides a battery including the electrode assembly described in any one of the above.

A fourth aspect of the present application provides an electrical device including the battery described above, the battery being configured to supply electric energy.

Since the battery and the electrical device of the present application have the same technical features as the battery electrode plate described in any one of the above and can achieve the same technical effects, they will not be described again here.

The above description is only a summary of the technical solutions of the present application. In order to understand the technical means of the present application more clearly, the technical means can be implemented according to the content of the specification. Furthermore, to make the above objectives and other objectives, features, and advantages of the present application more comprehensible, specific implementations of the present application are exemplified below.

DESCRIPTION OF DRAWINGS

Various other advantages and benefits will become apparent to those of ordinary skill in the art upon reading the following detailed description of the preferred embodiments. The drawings are for the purpose of illustrating the preferred implementations only and are not to be considered a limitation to the present application. Also, the same components are denoted by the same reference numerals throughout the drawings. In the drawings.

REFERENCE NUMERALS IN DETAILED DESCRIPTION ARE AS FOLLOWS

Figure 1:
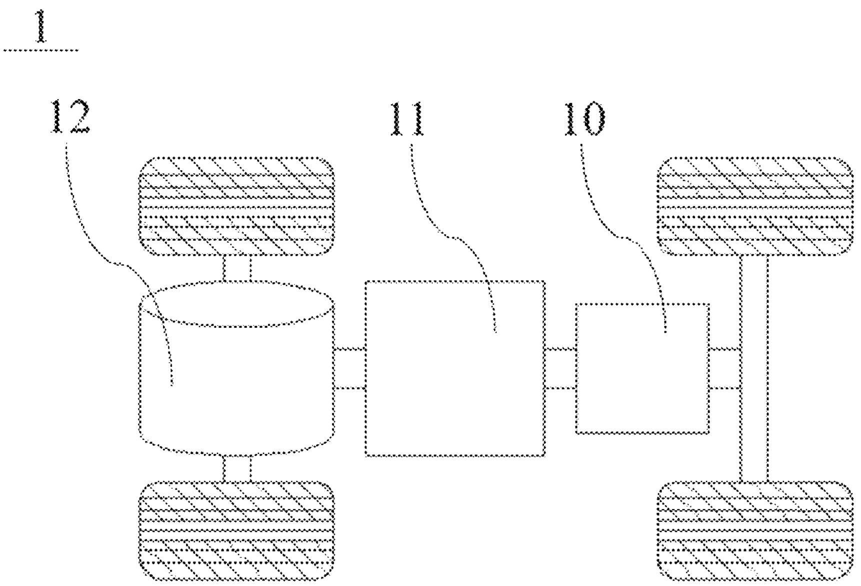
FIG. 1 is a schematic structural diagram of a vehicle provided in an embodiment of the present application.

1. vehicle;

10. battery, 11. controller, 12. motor;

20. battery module, 21. battery cell, 211. end cover, 212. case, 213. electrode assembly, 214. electrode terminal;
30. box, 301. first part, 302. second part;
40. battery electrode plate, 41. first coating area, 411. first active material layer, 412. second active material layer, 413. third active material layer, 42. second coating area, 43. tab area;
50. anode plate, 51. third coating area, 511. fourth coating area, 512. fifth coating area, 513. sixth coating area.

DETAILED DESCRIPTION

Embodiments of the technical solutions of the present application will be described in detail below with reference to the drawings. The following embodiments are only used to more clearly illustrate the technical solution of the present application, and therefore are only used as examples and cannot be used to limit the scope of protection of the present application.

It should be noted that, unless otherwise specified, the technical or scientific terms used in the embodiments of the present application should have the usual meanings as understood by those skilled in the art to which the embodiments of the present application belong.

In the descriptions of the embodiments of present application, orientations or positional relationships indicated by the technical terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", and the like are based on orientations or positional relationships as shown in the drawings, and are only for the purpose of facilitating and simplifying the descriptions of the embodiments of the present application instead of indicating or implying that apparatuses or elements indicated must have particular orientations, and be constructed and operated in the particular orientations, so that these terms are not construed as limiting the embodiments of the present application.

In addition, the technical terms "first," "second," etc. are used for descriptive purposes only, and cannot be construed as indicating or implying a relative importance, or implicitly specifying the number of the indicated technical features. In the description of the embodiments of the present application, the meaning of "a plurality of" is two or more, unless otherwise explicitly and specifically defined.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in embodiments of the present application can be understood according to specific situations.

In the description of the embodiments of the present application, unless otherwise explicitly specified and defined, the expression a first feature being "on" or "under" a second feature may be a case that the first feature is in direct contact with the second feature, or the first feature is in indirect contact with the second feature via an intermediate medium. Furthermore, the expression the first feature being "over," "above" and "on top of" the second feature may be a case that the first feature is directly above or obliquely above the second feature, or only means that the level of the first feature is higher than that of the second feature. The expression the first feature being "below", "underneath" or "under" the second feature may be a case that the first feature is directly underneath or obliquely underneath the second feature, or only means that the level of the first feature is lower than that of the second feature.

At present, from the perspective of the development of the market situation, power batteries are increasingly more widely used. Power batteries are not only applied in energy storage power source systems such as water, fire, wind, and solar power stations, but also widely applied in electric transportation tools, such as electric bicycles, electric motorcycles, and electric vehicles, as well as many fields, such as military equipment and aerospace. Lithium-ion batteries have been widely used in mobile and portable appliances due to their high energy density, high average open circuit voltage and long cycle life. The electrode plate of a commercial lithium-ion battery contains a current collector and an active material layer, where the active material layer is a continuous and uniform coating.

It has been noted by the inventors that liquid absorption capacity is an important parameter that affects the performance of a lithium-ion battery. The liquid absorption capacity of a battery is mainly limited by the liquid absorption capacity of the middle area of the electrode plate. Since the middle area of the electrode plate undertakes most of the liquid absorption function, and the heat dissipation capacity of the middle area of the electrode plate is poor, after the battery is used for a period of time, the attenuation speed of the middle area of the electrode plate is higher than that of the top and bottom of the electrode plate in the height direction, thereby affecting the overall service life of the battery.

In order to solve the problem that the attenuation speed in the middle area of the electrode plate is higher than the attenuation speeds at the top and bottom of the electrode plate in the height direction which results in a decrease in the overall service life of the battery, the applicant found through research that by setting different active materials along the height direction of the electrode plate, and making the attenuation speed of the active material in the middle area of the electrode plate smaller than the attenuation speeds at the top and bottom of the electrode plate in the height direction, it can be effectively ensured that the attenuation speeds of the electrode plate at various positions along the height direction are basically the same, thereby improving the overall service life of the battery.

Based on the above considerations, the inventor has conducted in-depth research and designed a battery electrode plate where a first active material layer, a second active material layer, and a third active material layer are sequentially connected from top to bottom in the height direction of the current collector of the battery electrode plate, and the attenuation speed of the active material of the second active material layer is smaller than the attenuation speed of the active material of any one of the first active material layer and the third active material layer, so that the attenuation speeds of the first active material layer, the second active material layer, and the third active material layer are basically the same, thereby improving the overall service life of the battery electrode plate and improving the overall service life of the battery.

The present application provides a battery electrode plate, an electrode plate assembly including the battery electrode plate, a battery, and an electrical device using the battery. This battery electrode plate and electrode plate assembly can be applied to any battery, such as battery cells, battery modules and battery packs, or primary batteries and secondary batteries. The batteries are applicable to various electrical devices using batteries, such as mobile phones, portable devices, laptops, battery vehicles, electric toys, electric tools, electric vehicles, ships, spacecrafts, and the like. For example, the spacecrafts include airplanes, rockets, space shuttles, spaceships, etc., and the batteries are used to provide electric energy for the above electrical devices.

It should be understood that the technical solutions described in the embodiments of the present application are not only applicable to the batteries and electrical devices described above, but also applicable to all batteries including a box and electrical devices using batteries. However, for the sake of brevity, the following embodiments are described by taking an electric vehicle as an example.

Referring to FIG. 1, FIG. 1 is a schematic structural diagram of a vehicle 1 provided in some embodiments of the present application. The vehicle 1 may be a fuel vehicle, a gas vehicle, or a new energy vehicle, and the new energy vehicle may be an all-electric vehicle, a hybrid electric vehicle, an extended range electric vehicle, etc. The vehicle 1 is internally provided with a battery 10, and the battery 10 may be arranged at a bottom or head or tail of the vehicle 1. The battery 10 may be used to power the vehicle 1. For example, the battery 10 may be used as an operating power source of the vehicle 1. The vehicle 1 may further include a controller 11 and a motor 12, wherein the controller 11 is used to control the battery 10 to supply power to the motor 12, for example, for the operating power demand when the vehicle 1 is starting, navigating and driving.

In some embodiments of the present application, the battery 10 may not only be used as the operating power source of the vehicle 1, but also be used as a driving power source of the vehicle 1 to replace or partially replace fuel or natural gas to provide driving power for the vehicle 1.

In order to meet different power usage requirements, the battery 10 may include a plurality of battery cells 21. The battery cell 21 refers to the smallest unit that constitutes a battery module 20 or a battery pack. The plurality of battery cells 21 may be connected in series and/or in parallel via electrode terminals to be used in various applications. The battery mentioned in the present application includes a battery module 20 or a battery pack. The plurality of battery cells 21 may be in series connection, parallel connection or series-parallel connection, and the series-parallel connection refers to a combination of series connection and parallel connection. The battery 10 may also be called a battery pack. In other words, the plurality of battery cells 21 in the embodiments of the present application may directly form a battery pack, or may first form battery modules 20, and then, the battery modules 20 form a battery pack.

Figure 2:
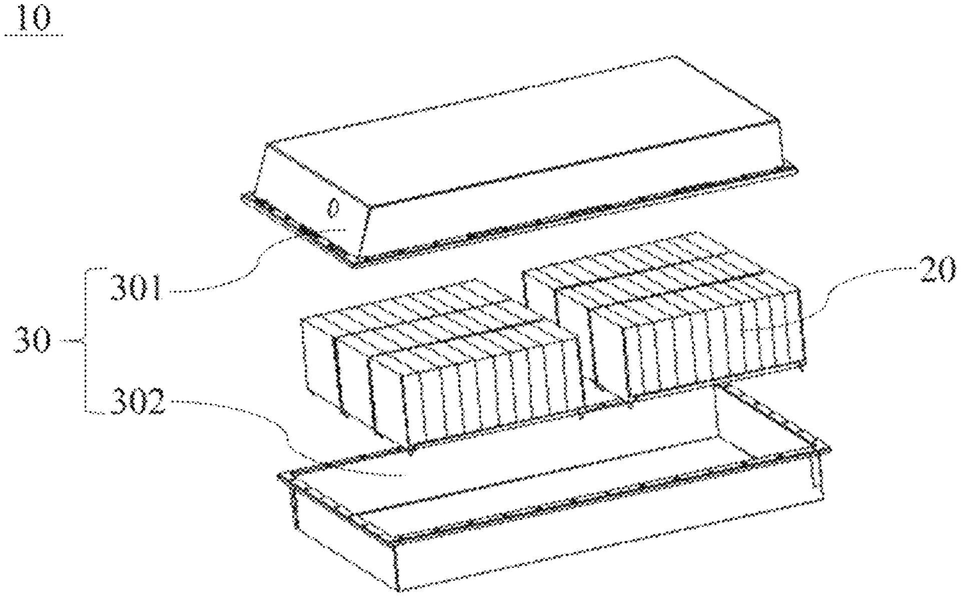
FIG. 2 is a schematic structural diagram of a battery pack provided in an embodiment of the present application.
Figure 3:
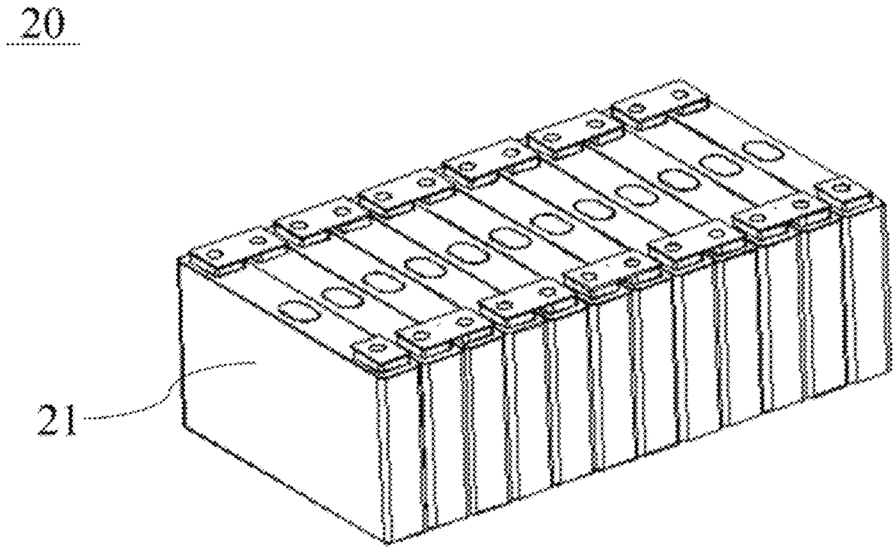
FIG. 3 is a schematic structural diagram of a battery module provided in an embodiment of the present application.

FIG. 2 is a schematic structural diagram of a battery 10 according to an embodiment of the present application. FIG. 3 is a schematic structural diagram of a battery module 20 according to an embodiment of the present application. As shown in FIGS. 2 and 3, the battery 10 may include a plurality of battery modules 20 and a box 30, and the plurality of battery modules 20 are accommodated in the box 30. The box 30 is used for accommodating the battery cells 21 or battery modules 20, to prevent liquid or other foreign matters from affecting charging or discharging of the battery cells 21. The box 30 can be a simple three-dimensional structure such as a single cuboid, a cylinder or a sphere, or a complex three-dimensional structure composed of simple three-dimensional structures such as a cuboid, a cylinder or a sphere, which will not be limited in the embodiments of the present application. The material of the box 30 can be alloy materials such as aluminum alloy, iron alloy, etc., or polymer materials such as polycarbonate and polyisocyanurate foam, or composite materials such as glass fiber and epoxy resin, which will not be limited in the embodiments of the present application.

In some embodiments, the box 30 may include a first part 301 and a second part 302. The first part 301 and the second part 302 are covered by each other, and together define the space for accommodating the battery cells 21. The second part 302 may be of a hollow structure with one end open, the first part 301 may be of a plate-like structure, and the first part 301 covers the opening side of the second part 302, such that the first part 301 and the second part 302 together define the space for accommodating the battery cells 21. Each of the first part 301 and the second part 302 may also be of a hollow structure with one side open, and the opening side of the first part 301 covers the opening side of the second part 302.

The battery module 20 may include a plurality of battery cells 21, and the plurality of battery cells 21 may be in series connection, parallel connection, or parallel-series connection to form battery modules 20 first, and then the plurality of battery modules 20 may be in series connection, parallel connection, or parallel-series connection to form the battery 10. The battery cell 21 may be in a cylindrical shape, a flat shape, a cuboid shape, or another shape, which is also not limited in the embodiments of the present application. The battery cells 21 are generally classified into three types according to encapsulating manners: cylindrical battery cells 21, prismatic battery cells 21 and pouch cells 21, which will also not be limited in the embodiments of the present application. However, for the sake of simplicity, the following embodiments will be described using a prismatic lithium-ion battery cell 21 as an example.

Figure 4:
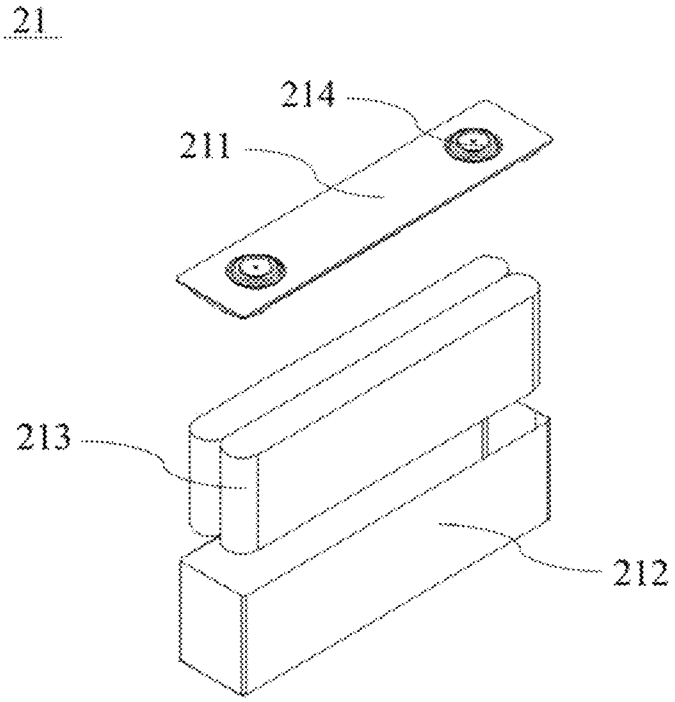
FIG. 4 is a schematic diagram of a disassembled structure of a battery cell provided in an embodiment of the present application.

FIG. 4 is a schematic diagram of a disassembled structure of a battery cell 21 provided in some embodiments of the present application. The battery cell 21 refers to the smallest unit constituting a battery 10. As shown in FIG. 4, the battery cell 21 includes an end cover 211, a case 212, and an electrode assembly 213.

The end cover 211 is a component that covers an opening of the case 212 to isolate the internal environment of the battery cell 21 from the external environment. Without limitation, the shape of the end cover 211 may be adaptive to the shape of the case 212 so as to be matched with the case 212. Optionally, the end cover 211 may be made of a material (e.g., an aluminum alloy) with a certain hardness and strength, accordingly, the end cover 211 is not easily deformed when being subjected to extrusion and collisions, such that the battery cell 21 can have higher structural strength, and the safety performance can also be improved. Functional components such as electrode terminals 214 may be arranged on the end cover 211. The electrode terminal 214 can be used for being electrically connected to the electrode assembly 213 for outputting or inputting electric energy of the battery cell 21. In some embodiments, the end cover 211 may be further provided with a pressure relief mechanism used for relieving internal pressure when the internal pressure or temperature of the battery cell 21 reaches a threshold. In some embodiments, an insulating member may be further arranged on an inner side of the end cover 211 and may be used for isolating an electrical connection component in the case 212 from the end cover 211, thereby reducing the risk of short circuit. Exemplarily, the insulating member may be made of plastic, rubber, etc.

The case 212 is an assembly used to be matched with the end cover 211 to form the internal environment of the battery cell 21, where the formed internal environment can be used to accommodate the electrode assembly 213, an electrolyte solution (not shown in the figure) and other components. The case 212 and the end cover 211 may be separate components, an opening may be formed in the case 212, and at the opening, the opening is covered with the end cover 211 so as to form the internal environment of the battery cell 21. Without limitation, the end cover 211 and the case 212 may also be integrated. Specifically, the end cover 211 and the case 212 may form a common connection surface before other components enter the case. When an interior of the case 212 needs to be encapsulated, the case 212 is covered with the end cover 211. The case 212 may be of various shapes and sizes, such as a rectangular solid, a cylinder and a hexagonal prism. Specifically, the shape of the case 212 may be determined according to the specific shape and size of the electrode assembly 213. The case 212 may be made of various materials, such as copper, iron, aluminum, stainless steel, an aluminum alloy and plastic, which is not particularly limited in this embodiment of the present application.

The electrode assembly 213 is a component in which an electrochemical reaction occurs in the battery cell 21. One or more electrode assemblies 213 may be contained within the case 212. The electrode assembly 213 is mainly formed by winding or stacking a positive electrode plate and a negative electrode plate, and a separator is usually arranged between the positive electrode plate and the negative electrode plate. The portions, with active materials, of the positive electrode plate and the negative electrode plate constitute a main body part of the electrode assembly 213, and the portions, without the active materials, of the positive electrode plate and the negative electrode plate respectively constitute tabs (not shown in the figure). The positive tab and the negative tab may be located at one end of the main body part together or at two ends of the main body part respectively. In the charging and discharging process of the battery, the positive electrode active material and the negative electrode active material react with the electrolyte solution, and the tabs are connected to the electrode terminals 214 to form a current loop.

It can be understood that the following embodiments illustrate the state of the battery cell 21 when it is placed vertically as shown in FIG. 3 as an example. The battery cell 21 may be placed in other ways in actual applications.

Figure 5:
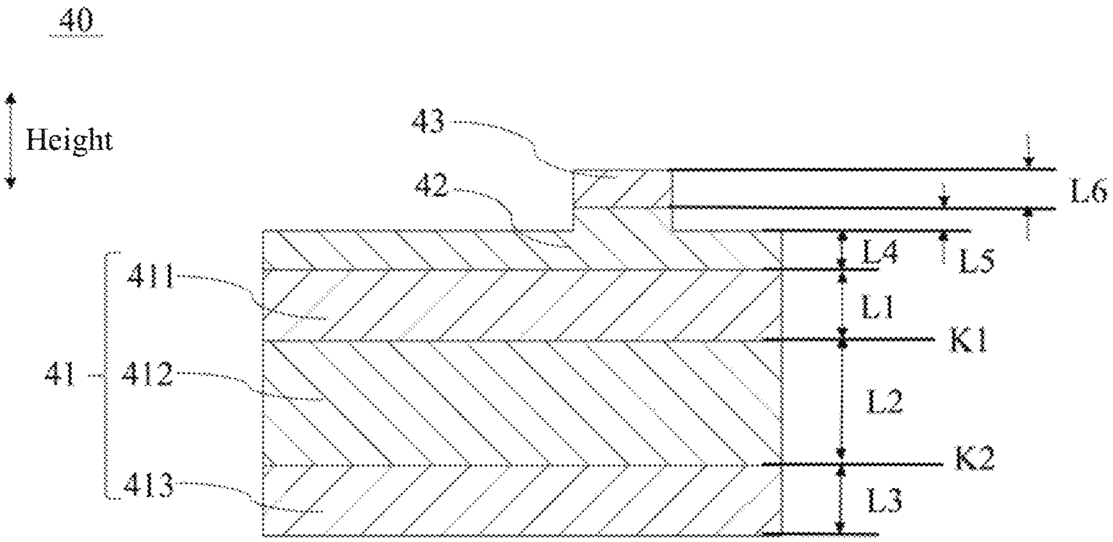
FIG. 5 is a schematic structural diagram of a battery electrode plate provided in an embodiment of the present application.
Figure 8:
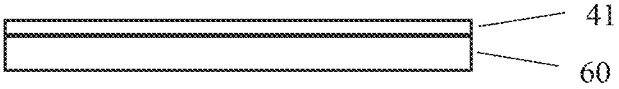
FIG. 8 is a schematic structural diagram of a cross-section of a battery electrode plate provided in an embodiment of the present application.

FIG. 5 is a schematic structural diagram of a battery electrode plate 40 provided in an embodiment of the present application. As shown in FIG. 5 and FIG. 8, the battery electrode plate 40 of the present application includes a current collector 60, at least one surface of the current collector being provided with a first coating area 41, the first coating area 41 being provided with an active material layer, and the active material layer including a first active material layer 411, a second active material layer 412, and a third active material layer 413 that are connected sequentially from top to bottom along the height direction of the current collector, wherein the attenuation speed of the active material of the second active material layer 412 is smaller than that of the active material in any one of the first active material layer 411 and the third active material layer 413.

Specifically, the current collector in the present application refers to a structure or part that collects current. Its function is mainly to collect the current generated by the active material of the battery to form a larger current for external output. In lithium-ion batteries, it mainly refers to metal foil, such as copper foil and aluminum foil.

The coating area refers to the area on the current collector used for coating materials. Of course, the current collector also includes areas that do not need to be coated, such as the location of the tabs on the current collector. The first coating area 41 of the present application is used for coating active materials.

The active material layer refers to a layered structure composed of active materials coated on the current collector.

The height direction of the current collector is the height direction of the battery electrode plate 40. The arrow direction shown in FIG. 5 is also the height direction of the electrode assembly 213 after the battery electrode plate 40 forms the electrode assembly 213 as shown in FIG. 4. Before the battery electrode plates 40 are wound or stacked to form the electrode assembly 213, that is, when the battery electrode plates 40 are in a flat unfolded state, the width direction of the battery electrode plates 40 is the height direction of the battery electrode plates 440 after forming the electrode assembly 213.

The connection arrangement here means that two adjacent active material layers are connected and arranged without overlapping areas.

The attenuation speed of an active material refers to the speed at which the active material loses its ability to react with the electrolyte solution.

In one embodiment of the present application, the battery electrode plate 40 is a cathode plate, and the current collector of the cathode plate is an aluminum foil. The first active material layer 411, the second active material layer 412, and the third active material layer 413 are provided on one or both sides of the aluminum foil by coating.

According to the battery electrode plate 40 of the present application, the first active material layer 411, the second active material layer 412, and the third active material layer 413 are connected sequentially from top to bottom in the height direction of the current collector, wherein the attenuation speed of the active material of the second active material layer 412 is smaller than that of the active material in any one of the first active material layer 411 and the third active material layer 413, so that the attenuation speed of the second active material layer 412 can be reduced, and the attenuation speed caused by the middle area of the battery electrode plate 40 bearing most of the liquid absorption capacity as well as the attenuation speed caused by poor heat dissipation ability can be offset. In this way, the attenuation speeds of the first active material layer 411, the second active material layer 412, and the third active material layer 413 are basically the same, thereby ensuring the overall service life of the battery electrode plate 40, and improving the overall service life of the battery.

In some embodiments of the present application, as shown in FIG. 5, the second active material layer 412 includes one or more of a lithium iron phosphate layer, a lithium iron manganese phosphate layer, and a lithium titanate layer.

Specifically, the main active material of the lithium iron phosphate layer includes lithium iron phosphate, the main active material of the lithium iron manganese phosphate layer includes lithium iron manganese phosphate, and the main active material of the lithium titanate layer includes lithium titanate. One or more active materials of the above lithium iron phosphate, lithium iron manganese phosphate, and lithium titanate are made into a slurry and applied to the middle position of the current collector in the height direction, thereby forming the second active material layer 412.

Among them, lithium iron phosphate, lithium iron manganese phosphate and lithium titanate all have high stability and service life, and have a slower attenuation speed than ordinary electrode materials, thereby reducing the attenuation speed of the second active material layer 412 and offsetting the attenuation speed caused by the middle region of the electrode plate bearing most of the liquid absorption capacity and the attenuation speed caused by poor heat dissipation ability, so that the attenuation speeds of the first active material layer 411, the second active material layer 412 and the third active material layer 413 are basically the same.

In some embodiments of the present application, as shown in FIG. 5, the first active material layer 411 includes at least one of a nickel-cobalt-manganese layer and a lithium cobalt oxide layer; and/or the third active material layer 413 includes at least one of a nickel-cobalt-manganese layer and a lithium cobalt oxide layer.

Specifically, the main active material of the nickel-cobalt-manganese layer includes nickel-cobalt-manganese, and the main active material of the lithium cobalt oxide layer includes lithium cobalt oxide. One or two active materials of nickel-cobalt-manganese and lithium cobalt oxide are made into a slurry and applied to the upper connection position of the second active material layer 412, thereby forming the first active material layer 411. One or two active materials of nickel-cobalt-manganese and lithium cobalt oxide are made into a slurry and applied to the lower connection position of the second active material layer 412 to form the third active material layer 413.

Among them, nickel-cobalt-manganese and lithium cobalt oxide both have high energy density, thus ensuring the energy of the battery. At the same time, the attenuation speeds of nickel-cobalt-manganese and lithium cobalt oxide are both higher than those of lithium iron phosphate, lithium iron manganese phosphate and lithium titanate, and combined with the top and bottom of the battery electrode plate 40 in the height direction which bear a small part of the liquid absorption capacity compared with the middle area and have good heat dissipation ability, offset can be achieved, so that the attenuation speeds of the first active material layer 411, the second active material layer 412 and the third active material layer 413 are basically the same.

In some embodiments of the present application, as shown in FIG. 5, the average particle size of the active material of the second active material layer 412 is smaller than that of the active material of any one of the first active material layer 411 and the third active material layer 413.

Specifically, the size of particles is called "grain size", also known as "particle size" or "diameter". When a certain physical characteristic or physical behavior of a measured particle is closest to a homogeneous sphere (or combination) of a certain diameter, the diameter of the sphere (or combination) is regarded as the equivalent particle size (or particle size distribution) of the measured particle. The average particle size of the active material of the second active material layer 412 is smaller than the average particle size of the active material of the first active material layer 411, and at the same time, the average particle size of the active material of the second active material layer 412 is smaller than the average particle size of the active material of the third active material layer 413.

Among them, a small average particle size indicates that the gaps between the particles are small, thereby slowing down the infiltration rate of the electrolyte solution in the battery electrode plate 40, and reducing the liquid absorption capacity of the battery electrode plate 40. If the average particle size of the active material of the second active material layer 412 is smaller than the average particle size of the active material in any one of the first active material layer 411 and the third active material layer 413, the liquid absorption capacity of the second active material layer 412 can be effectively reduced, thereby reducing the attenuation speed of the second active material layer 412.

In some embodiments of the present application, as shown in FIG. 5, the average particle size of the active material of the second active material layer 412 is 100% to 120% of the average particle size of the active material of the first active material layer 411; and/or the average particle size of the active material of the second active material layer 412 is 100% to 120% of the average particle size of the active material of the third active material layer 413.

Specifically, the average particle size of the active material of the second active material layer 412 is 100% to 120% of the average particle size of the active material of the first active material layer 411, and at the same time, the average particle size of the active material of the second active material layer 412 is 100% to 120% of the average particle size of the active material of the third active material layer 413. Or, the average particle size of the active material of the second active material layer 412 is 100% to 120% of the average particle size of the active material of the first active material layer 411, and at the same time, the average particle size of the active material of the second active material layer 412 is smaller than the average particle size of the active material of the third active material layer 413. Or, the average particle size of the active material of the second active material layer 412 is smaller than the average particle size of the active material of the first active material layer 411, and at the same time, the average particle size of the active material of the second active material layer 412 is 100% to 120% of the average particle size of the active material of the third active material layer 413.

The average particle size of the active material of the second active material layer 412 is set to be greater than the average particle size of the active material of the first active material layer 411, and/or the average particle size of the active material of the second active material layer 412 is set to be greater than the average particle size of the active material of the third active material layer 413, and the difference is within 20%. At the same time, the attenuation speed of the active material of the second active material layer 412 is smaller than that of the active material of the first active material layer 411 and that of the active material of the third active material layer 413, it can also be ensured that the attenuation speeds of the first active material layer 411, the second active material layer 412, and the third active material layer 413 are basically the same.

In some embodiments of the present application, as shown in FIG. 5, a first boundary line K1 is provided between the first active material layer 411 and the second active material layer 412, and a second boundary line K2 is provided between the second active material layer 412 and the third active material layer 413. The first boundary line K1 and the second boundary line K2 are respectively arranged parallel to both ends of the current collector in the height direction.

Specifically, the first boundary line is K1, which is the separation line between the first active material layer 411 and the second active material layer 412 in the first coating area 41, and the second boundary line is K2, which is the separation line between the second active material layer 412 and the third active material layer 413 in the first coating area 41.

Since the current collector has a substantially rectangular structure, the first boundary line K1 and the second boundary line K2 are respectively arranged parallel to both ends of the current collector in the height direction, so that the first active material layer 411, the second active material layer 412 and the third active material layer 413 are separated into a connected rectangular structure, thereby ensuring that there are the same active material layers along the same height direction of the current collector, so that the attenuation speeds of the first active material layer 411, the second active material layer 412 and the third active material layer 413 are basically the same.

In some embodiments of the present application, as shown in FIG. 5, the second active material layer 412 is disposed at the middle position of the current collector in the height direction. The height dimension L1 of the first active material layer 411 is 10% to 40% of the height dimension of the first coating area 41, the height dimension L2 of the second active material layer 412 is 20% to 80% of the height dimension of the first coating area 41, and the height dimension L3 of the third active material layer 413 is 10% to 40% of the height dimension of the first coating area 41.

Specifically, the height dimension of the active material layer is the dimension of the active material layer in the height direction of the first coating area 41, and the height direction of the first coating area 41 is the height direction of the current collector, as indicated by the arrow in FIG. 5. The height dimension of the first coating area is the sum of the height dimension L1 of the first active material layer 411, the height dimension L2 of the second active material layer 412, and the height dimension L3 of the third active material layer 413.

Since the first active material layer 411, the second active material layer 412 and the third active material layer 413 are arranged along the height direction of the first coating area 41, and the second active material layer 412 occupies the middle position of the current collector and bears most of the liquid absorption capacity, so the second active material layer 412 occupies a large proportion of height dimension.

According to the height dimension of the first coating area 41, the height dimensions of the first active material layer 411, the second active material layer 412, and the third active material layer 413 are arranged according to the above ratio, which can ensure that the attenuation speeds of the first active material layer 411, the second active material layer 412, and the third active material layer 413 are basically the same.

In some embodiments of the present application, as shown in FIG. 5, the height dimension L1 of the first active material layer 411 is 25% to 35% of the height dimension of the first coating area 41, the height dimension L2 of the second active material layer 412 is 40% to 50% of the height dimension of the first coating area 41, and the height dimension L3 of the third active material layer 413 is 20% to 30% of the height dimension of the first coating area.

Specifically, the height dimension L1 of the first active material layer 411 is 30% of the height dimension of the first coating area 41, the height dimension L2 of the second active material layer 412 is 45% of the height dimension of the first coating area 41, and the height dimension L3 of the third active material layer 413 is 25% of the height dimension of the first coating area.

The arrangement ratio of the above height dimensions is only one of the optimal arrangement ratios of embodiments of the present application, so that the attenuation speeds of the first active material layer 411, the second active material layer 412, and the third active material layer 413 are basically the same.

In some embodiments of the present application, as shown in FIG. 5, the coating weight of the second active material layer 412 is 50% to 100% of the coating weight of the first active material layer 411, and the coating weight of the third active material layer 413 is 80% to 120% of the coating weight of the first active material layer 411.

Specifically, the coating weight refers to the total weight of the active materials in the corresponding active material layer. Among them, the total weight of the active material corresponding to the second active material layer 412 is 50% to 100% of the total weight of the active material corresponding to the first active material layer 411, and the total weight of the active material corresponding to the third active material layer 413 is 80% to 120% of the total weight of the active material corresponding to the first active material layer 411.

According to the different materials of the first active material layer 411, the second active material layer 412, and the third active material layer 413, and according to the arrangement ratio of the height dimensions of the first active material layer 411, the second active material layer 412, and the third active material layer 413, the first active material layer 411, the second active material layer 412, and the third active material layer 413 are arranged according to the above three weight ratios, which can ensure that the attenuation speeds of the first active material layer 411, the second active material layer 412, and the third active material layer 413 are basically the same.

In some embodiments of the present application, as shown in FIG. 5, the ratio of the coating weight of the first active material layer 411, the coating weight of the second active material layer 412, and the coating weight of the third active material layer 413 is 90%-110%:60%-80%:90%-110%.

Specifically, the ratio of the coating weight of the first active material layer 411, the coating weight of the second active material layer 412, and the coating weight of the third active material layer 413 is 100%:70%:100%.

The arrangement ratio of the above coating weights is one of the optimal arrangement ratios of embodiments of the present application, so that the attenuation speeds of the first active material layer 411, the second active material layer 412, and the third active material layer 413 are basically the same.

In some embodiments of the present application, as shown in FIG. 5, the coating thickness of the second active material layer 412 is 90% to 100% of the coating thickness of the first active material layer 411, the coating thickness of the third active material layer 413 is 80% to 110% of the coating thickness of the first active material layer 411, and the compacted density of the second active material layer 412 is less than that of any one of the first active material layer 411 and the third active material layer 413.

Specifically, the coating direction refers to the direction perpendicular to the plane where the first coating area 41 is located, and the coating thickness of the active material layer is the dimension of the active material layer in the direction perpendicular to the plane where the first coating area 41 is located. The compacted density refers to the density of the active material layer 411 after compaction and forming.

According to the different materials of the first active material layer 411, the second active material layer 412 and the third active material layer 413, the first active material layer 411, the second active material layer 412 and the third active material layer 413 are arranged according to the above height dimension ratio, coating thickness ratio and coating weight ratio, wherein the coating weight of the second active material layer 412 is significantly smaller than the coating weights of the first active material layer 411 and the third active material layer 413, and the coating thickness of the second active material layer 412 is within a small deviation from the coating thicknesses of the first active material layer 411 and the third active material layer 413, resulting in a compacted density of the second active material layer 412 that is smaller than the compacted density of any one of the first active material layer 411 and the third active material layer 413, which is conducive to the preservation of electrolyte solution, reduces the material expansion amplitude of the second active material layer 412 during the discharge process, and reduces the competitive effect on the top and bottom absorption of electrolyte solution.

In some embodiments of the present application, as shown in FIG. 5, the coating thickness of the first active material layer 411, the coating thickness of the second active material layer 412, and the coating thickness of the third active material layer 413 are consistent.

Specifically, the coating thicknesses of the first active material layer 411, the second active material layer 412 and the third active material layer 413 in the first coating area 41 are consistent, that is, the surface of the first coating area 41 has a planar structure, without protrusions or step-like structures, thereby avoiding structural problems such as powder drop or stress concentration during the use of the battery electrode plate 40.

In some embodiments of the present application, as shown in FIG. 5, the current collector is also provided with a second coating area 42 and a tab area 43, and the tab area 43, the second coating area 42, and the first coating area 41 are sequentially arranged on the same surface from top to bottom along the height direction of the current collector, wherein the second coating area 42 is connected to the first coating area 41, and the second coating area 42 is partially overlapped with the tab area 43. The second coating area 42 is provided with an insulating material layer, the tab area 43 includes a metal conductive plate, and the metal conductive plate is connected to the current collector or the metal conductive plate is a part of the current collector.

Specifically, the second coating area 42 of the present application is used for coating insulating materials, and the insulating materials include non-conductive materials such as ceramics and resins. The tab area 43 forms a tab for connecting the current collector and the electrode terminal.

The connection arrangement here means that the second coating area 42 is connected to the first coating area 41 without overlapping areas. The first coating area 41 is only coated with the active material layer, and the second coating area 42 is only coated with the insulating material.

The overlapping arrangement means that the second coating area 42 and the tab area 43 are connected and have parts covering each other. That is, a part of the structure of the second coating area 42 coated with the insulating material is also a part of the structure of the tab area 43.

In some embodiments of the present application, the height dimension of the second coating area 42 is much smaller than the height dimension of the first coating area 41 and can be ignored when calculating the overall height dimension of the current collector. The height dimension of the first coating area 41 represents the height dimension of the current collector.

The battery electrode plate 40 of the present application can be conductively connected to other components through the tab area 43, and the second coating area 42 is provided between the tab area 43 and the first coating area 41, wherein the second coating area 42 is provided with an insulating material layer, and the second coating area 42 is partially overlapped with the tab area 43, thereby isolating the tab area 43 from the active material layer through the insulating material layer, preventing the tab area 43 from being conductively connected to the case after the battery electrode plate 40 and the case are assembled into a battery, thereby avoiding leakage of electricity in the battery assembled by the present application.

In some embodiments of the present application, as shown in FIG. 5, the height dimension L5 of the overlapping portion of the second coating area 42 and the tab area 43 is 4 mm to 16 mm, and the height dimension L4 of the second coating area 42 excluding the overlapping portion with the tab area 43 is 0.5 mm to 4 mm.

Specifically, the overlapping portion of the second coating area 42 and the tab area 43 protrudes to the outside of the case of the assembled battery. Since the overlapping portion of the second coating area 42 and the tab area 43 is coated with an insulating material, even if this part comes into contact with the case, no conductive connection will occur, thereby preventing battery leakage. At the same time, in order to prevent the active material layer of the first coating area 41 from protruding to the outside of the case, the height dimension L4 of the second coating area 42 excluding the overlapping portion with the tab area 43 is 0.5 mm to 4 mm. The height dimension of the part of the tab area 43 that is not coated with insulating material is L6, and the overall height dimension of the tab area 43 is L5+L6. The specific size depends on the actual situation, and is generally between 6 mm and 40 mm.

By setting the above height dimension range, the conductive connection between the battery electrode plate 40 and the case can be effectively prevented, thereby preventing battery leakage.

Figure 6:
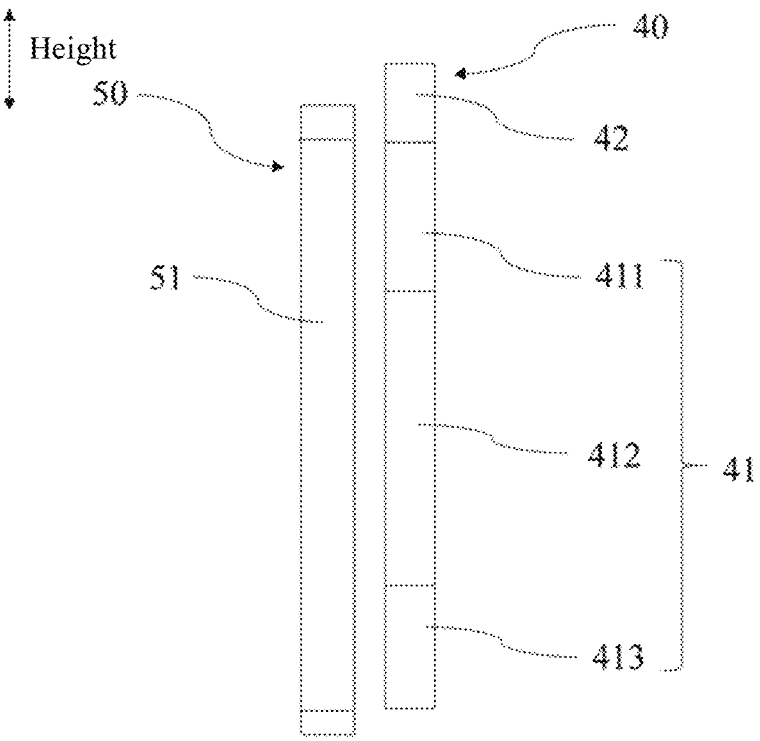
FIG. 6 is a schematic structural diagram of an electrode assembly provided in an embodiment of the present application.

FIG. 6 is a schematic structural diagram of an electrode assembly provided in an embodiment of the present application. As shown in FIG. 6, a second aspect of the present application proposes an electrode assembly. The electrode assembly includes a cathode plate, an anode plate 50, and a separator (not shown in the figure) disposed between the cathode plate and anode plate 50, wherein the cathode plate is the battery electrode plate 40 in any of the above embodiments.

Since the electrode assembly of the present application has the same technical features as the battery electrode plate 40 described in any one of the above and can achieve the same technical effects, it will not be described again here.

In some embodiments of the present application, as shown in FIG. 6, at least one surface of the anode plate 50 is provided with a third coating area 51 directly opposite to the first coating area 41, and both ends of the anode plate 50 are respectively set beyond the two ends of the first coating area 41.

Specifically, the third coating area 51 is coated with an anode active material. The first coating area 41 and the third coating area 51 are arranged opposite to each other and have approximately equal areas. The first coating area 41 and the third coating area are 51 are used together to react with the electrolyte solution and generate electric current. The coating method of each position of the third coating area 51 along the height direction is consistent, including the same coating material, coating thickness and coating density, and both ends of the anode plate 50 along the height direction respectively exceed the both ends of the first coating area 41, which may include an insulating layer or anode tab.

The first coating area 41 includes a first active material layer 411, a second active material layer 412 and a third active material layer 413 arranged sequentially along the height direction. The coating method of the first active material layer 411, the second active material layer 412 and the third active material layer 413 may be consistent with the coating method of the battery electrode plate 40 in any of the above embodiments.

By arranging the third coating area 51 directly opposite to the first coating area 41, it can be ensured that all active materials in the first coating area 41 and the third coating area 51 participate in the reaction with the electrolyte solution, that is, participate in the discharge process of the electrode assembly, thereby improving the energy of the battery.

At the same time, the battery usage rate at the middle position of the third coating area 51 corresponding to the second active material layer 412 is 50% to 90% of the battery usage rate at the top and bottom of the third coating area 51, that is, is 50% to 90% of the battery usage rate at the positions corresponding to the first active material layer 411 and the third active material layer 413, thereby effectively improving the expansion force of the anode plate 50 and reducing the expansion and deformation of the anode plate 50 by 20%.

Figure 7:
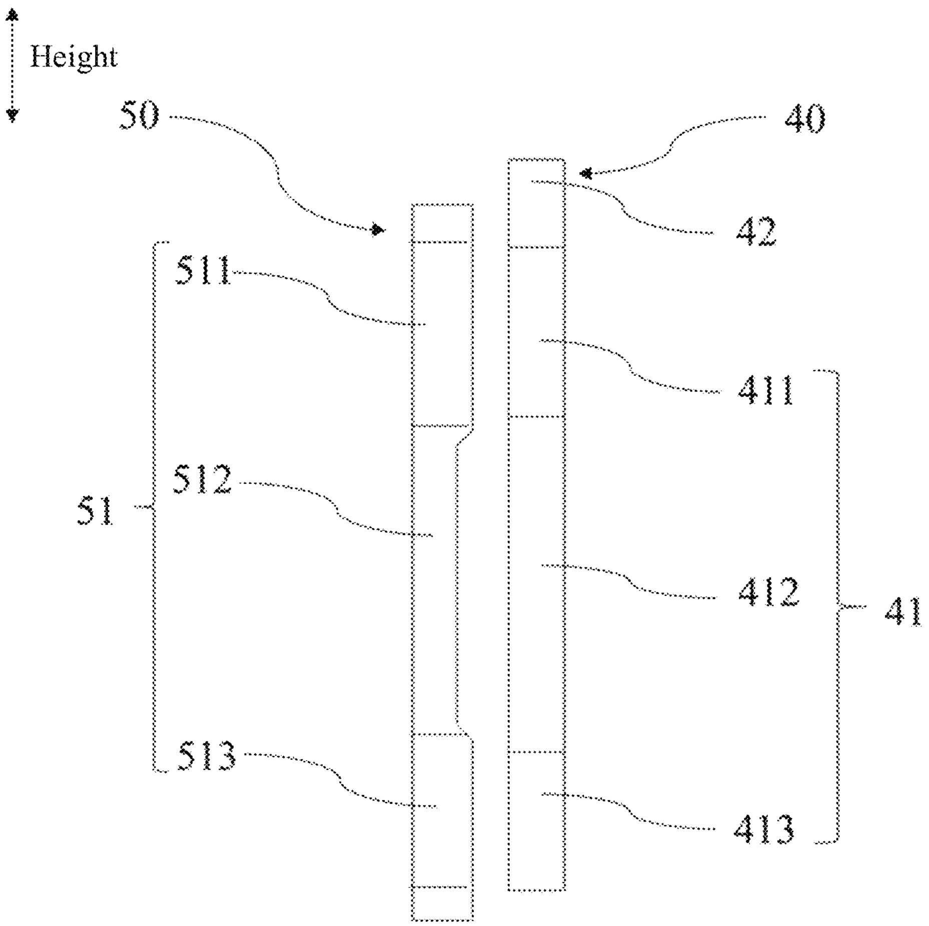
FIG. 7 is a schematic structural diagram of an electrode assembly provided in another embodiment of the present application.

FIG. 7 is a schematic structural diagram of an electrode assembly provided in another embodiment of the present application. As shown in FIG. 7, in some embodiments of the present application, the third coating area 51 includes a fourth active material layer 511, a fifth active material layer 512, and a sixth active material layer 513 that are sequentially connected from top to bottom along the height direction of the third coating area 51, wherein the ratio of the coating weights of the fourth active material layer 511, the fifth active material layer 512, and the sixth active material layer 513 is consistent with the ratio of the coating weights of the first active material layer 411, the second active material layer 412, and the third active material layer 413, and/or the ratio of the coating thicknesses of the fourth active material layer 511, the fifth active material layer 512, and the sixth active material layer 513 is consistent with the ratio of the coating thicknesses of the first active material layer 411, the second active material layer 412, and the third active material layer 413, and/or the height dimension of the fourth active material layer 511 is 100% to 140% of the height dimension of the first active material layer 411, the height dimension of the fifth active material layer 512 is 20% to 100% of the height dimension of the second active material layer 412, and the height dimension of the sixth active material layer 513 is 100% to 140% of the height dimension of the third active material layer 413.

Specifically, the height direction of the third coating area 51 is the height direction of the anode plate 50, and the height direction of the anode plate 50 is the same as the height direction of the battery electrode plate 40. The fourth active material layer 511, the fifth active material layer 512 and the sixth active material layer 513 are respectively coated with anode materials, and the ratio of coating weights of the anode materials is consistent with that of the first active material layer 411, the second active material layer 412 and the third active material layer 413, and/or the ratio of coating thicknesses of the anode materials is consistent with that of the first active material layer 411, the second active material layer 412 and the third active material layer 413, and/or arranged in accordance with the ratio of height dimensions described above.

Arranging the fourth active material layer 511, the fifth active material layer 512, and the sixth active material layer 513 according to the above coating weight and/or coating thickness and/or height dimension ratio can effectively reduce the attenuation speed of the middle area of the anode plate 50, ensuring that the attenuation speeds of active material layers along the height direction of the anode plate 50 are basically the same, thereby cooperating with the cathode plate 40 to jointly improve the service life of the battery.

In some embodiments of the present application, as shown in FIG. 7, the coating thickness of the fifth active material layer 512 is 50% to 99% of the coating thickness of the fourth active material layer 511, and/or the coating thickness of the fifth active material layer 512 is 50% to 99% of the coating thickness of the sixth active material layer 513.

Specifically, since the battery usage rate of the fifth active material layer 512 is low, the coating thickness of the fifth active material layer 512 is set smaller than that of the fourth active material layer 511 and smaller than that of the sixth active material layer 513.

The fourth active material layer 511, the fifth active material layer 512, and the sixth active material layer 513 are arranged according to the above coating thickness ratio, so that the use of the active material in the fifth active material layer 512 is reduced under the condition that the attenuation speeds of active material layers in the height direction of the anode plate 50 are basically the same, thereby reducing the manufacturing cost of the electrode plate assembly and avoiding the waste of resources.

Further, since the coating thickness of the fifth active material layer 512 is set to be smaller than the coating thickness of the fourth active material layer 511 and smaller than the coating thickness of the sixth active material layer 513, a stepped surface is formed between the fourth active material layer 511, the fifth active material layer 512, and the sixth active material layer 513. By setting chamfers at the connections between the fifth active material layer 512 and the fourth active material layer 511, as well as between the fifth active material layer 512 and the sixth active material layer 513, stress concentration can be effectively prevented, and damage to the anode plate 50 can be avoided.

A third aspect of the present application provides a battery including the electrode assembly described in any one of the above embodiments.

A fourth aspect of the present application provides an electrical device including the battery described in any one of the above embodiments, the battery being configured to supply electric energy.

The electrical device can be any of the aforementioned electrical devices.

Since the battery and the electrical device of the present application have the same technical features as the battery electrode plate 40 described in any one of the above and can achieve the same technical effects, they will not be described again here.

The above description is only a summary of the technical solutions of the present application. In order to understand the technical means of the present application more clearly, the technical means can be implemented according to the content of the specification. Furthermore, to make the above objectives and other objectives, features, and advantages of the present application more comprehensible, specific implementations of the present application are exemplified below.

In one embodiment of the present application, as shown in FIG. 5, the battery electrode plate 40 includes a first coating area 41, a second coating area 42 and a tab area 43. Among them, the tab area 43, the second coating area 42 and the first coating area 41 are arranged sequentially from top to bottom along the height direction of the current collector, wherein the second coating area 42 is connected to the first coating area 41, the second coating area 42 and the tab area 43 are partially overlapped, the second coating area 42 is provided with an insulating material layer, the tab area 43 includes a metal conductive plate, and the metal conductive plate is a part of the current collector. The height dimension L5 of the overlapping portion of the second coating area 42 and the tab area 43 is 4 mm to 16 mm. The height dimension of the second coating area 42 excluding the overlapping portion L4 with the tab area 43 is 0.5 to 4 mm. The height dimension of the tab area 43 is L5+L6, and the height dimension is generally 6 mm to 40 mm.

The first coating area 41 is provided with an active material layer, and the active material layer includes a first active material layer 411, a second active material layer 412, and a third active material layer 413 that are connected sequentially from top to bottom along the height direction of the current collector, wherein the second active material layer 412 is disposed at the middle position of the current collector in the height direction, and the attenuation speed of the active material of the second active material layer 412 is smaller than that of the active material in any one of the first active material layer 411 and the third active material layer 413. The second active material layer 412 includes one or more of a lithium iron phosphate layer, a lithium iron manganese phosphate layer, and a lithium titanate layer, the first active material layer 411 includes at least one of a nickel-cobalt-manganese layer and a lithium cobalt oxide layer, and the third active material layer 413 includes at least one of a nickel-cobalt-manganese layer and a lithium cobalt oxide layer. The average particle size of the active material of the second active material layer 412 is smaller than that of the active material of any one of the first active material layer 411 and the third active material layer 413. A first boundary line K1 is provided between the first active material layer 411 and the second active material layer 412, and a second boundary line K2 is provided between the second active material layer 412 and the third active material layer 413. The first boundary line K1 and the second boundary line K2 are respectively arranged parallel to both ends of the current collector in the height direction. The height dimension L1 of the first active material layer 411 is 30% of the height dimension of the first coating area 41, the height dimension L2 of the second active material layer 412 is 45% of the height dimension of the first coating area 41, and the height dimension L3 of the third active material layer 413 is 25% of the height dimension of the first coating area 41. The ratio of the coating weight of the first active material layer 411, the coating weight of the second active material layer 412, and the coating weight of the third active material layer 413 is 100%:70%:100%. The coating thickness of the second active material layer 412 is 90% to 100% of the coating thickness of the first active material layer 411, the coating thickness of the third active material layer 413 is 80% to 110% of the coating thickness of the first active material layer 411, and the compacted density of the second active material layer 412 is less than that of any one of the first active material layer 411 and the third active material layer 413.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A battery electrode plate, wherein a surface of the battery electrode plate includes a first coating area, the first coating area being provided with an active material layer, and the active material layer comprising a first active material layer, a second active material layer, and a third active material layer that are connected sequentially along a height direction of the battery electrode plate, wherein the height dimension is defined as a dimension measured along a direction parallel to a protrusion direction of tabs formed on a current collector of the battery electrode plate, and wherein an attenuation speed of an active material of the second active material layer is smaller than that of an active material in any one of the first active material layer and the third active material layer;

the surface of the battery electrode plate has a rectangular shape having a height and a length in a case that the battery electrode plate is in a flat unfolded state, the height being smaller than the length; and a height dimension of the second active material layer is larger than each of a height dimension of the first active material layer and a height dimension of the third active material layer.

2. The battery electrode plate according to claim 1, wherein the second active material layer comprises one or more of a lithium iron phosphate layer, a lithium iron manganese phosphate layer, or a lithium titanate layer.

3. The battery electrode plate according to claim 2, wherein the first active material layer comprises at least one of a nickel-cobalt-manganese containing layer or a lithium cobalt oxide layer; and/or the third active material layer comprises at least one of a nickel-cobalt-manganese containing layer or a lithium cobalt oxide layer.

4. The battery electrode plate according to claim 1, wherein an average particle size of the active material of the second active material layer is smaller than that of the active material of any one of the first active material layer and the third active material layer.

5. The battery electrode plate according to claim 1, wherein the average particle size of the active material of the second active material layer is 100% to 120% of the average particle size of the active material of the first active material layer; and/or the average particle size of the active material of the second active material layer is 100% to 120% of the average particle size of the active material of the third active material layer.

6. The battery electrode plate according to claim 1, wherein a first boundary line is provided between the first active material layer and the second active material layer, a second boundary line is provided between the second active material layer and the third active material layer, and the first boundary line and the second boundary line are respectively arranged parallel to both ends of the battery electrode plate in the height direction.

7. The battery electrode plate according to claim 6, wherein the second active material layer is disposed at the middle position of the battery electrode plate in the height direction, the height dimension of the first active material layer is 10% to 40% of the height dimension of the first coating area, the height dimension of the second active material layer is 20% to 80% of the height dimension of the first coating area, and the height dimension of the third active material layer is 10% to 40% of the height dimension of the first coating area.

8. The battery electrode plate according to claim 7, wherein the height dimension of the first active material layer is 25% to 35% of the height dimension of the first coating area, the height dimension of the second active material layer is 40% to 50% of the height dimension of the first coating area, and the height dimension of the third active material layer is 20% to 30% of the height dimension of the first coating area.

9. The battery electrode plate according to claim 7, wherein an coating weight of the second active material layer is 50% to 100% of an coating weight of the first active material layer, and an coating weight of the third active material layer is 80% to 120% of the coating weight of the first active material layer.

10. The battery electrode plate according to claim 9, wherein a ratio of the coating weight of the first active material layer, the coating weight of the second active material layer, and the coating weight of the third active material layer is 100%:70%:100%.

11. The battery electrode plate according to claim 9, wherein a coating thickness of the second active material layer is 90% to 100% of a coating thickness of the first active material layer, a coating thickness of the third active material layer is 80% to 110% of the coating thickness of the first active material layer, and a compacted density of the second active material layer is less than that of any one of the first active material layer and the third active material layer.

12. The battery electrode plate according to claim 1, wherein the surface of the battery electrode plate further includes a second coating area and a tab area, and the tab area, the second coating area, and the first coating area are sequentially arranged on the same surface along the height direction of the battery electrode plate, wherein the second coating area is connected to the first coating area, the second coating area is partially overlapped with the tab area, the second coating area is provided with an insulating material layer, and the tab area comprises a metal conductive plate.

13. The battery electrode plate according to claim 12, wherein the height dimension of the overlapping portion of the second coating area and the tab area is 4 mm to 16 mm, and the height dimension of the second coating area excluding the overlapping portion with the tab area is 0.5 mm to 4 mm.

14. An electrode assembly, comprising a cathode plate, an anode plate, and a separator disposed between the cathode plate and the anode plate, wherein the cathode plate is the battery electrode plate according to claim 1.

15. The electrode assembly according to claim 14, wherein at least one surface of the anode plate is provided with a third coating area directly opposite to the first coating area, and both ends of the anode plate are respectively set beyond the two ends of the first coating area.

16. The electrode assembly according to claim 15, wherein the third coating area comprises a fourth active material layer, a fifth active material layer, and a sixth active material layer that are sequentially connected along the height direction of the third coating area, wherein the ratio of the coating weights of the fourth active material layer, the fifth active material layer, and the sixth active material layer is the same with the ratio of the coating weights of the first active material layer, the second active material layer, and the third active material layer, and/or the ratio of the coating thicknesses of the fourth active material layer, the fifth active material layer, and the sixth active material layer is the same with the ratio of the coating thicknesses of the first active material layer, the second active material layer, and the third active material layer, and/or the height dimension of the fourth active material layer is 100% to 140% of the height dimension of the first active material layer, the height dimension of the fifth active material layer is 20% to 100% of the height dimension of the second active material layer, and the height dimension of the sixth active material layer is 100% to 140% of the height dimension of the third active material layer.

17. The electrode assembly according to claim 16, wherein the coating thickness of the fifth active material layer is 50% to 99% of the coating thickness of the fourth active material layer, and/or the coating thickness of the fifth active material layer is 50% to 99% of the coating thickness of the sixth active material layer.

18. A battery, comprising the electrode assembly according to claim 14.

19. An electrical device, comprising the battery according to claim 18, wherein the battery is used to provide electric energy.

* * * * *